(12) United States Patent
Wade et al.

(10) Patent No.: US 11,099,765 B2
(45) Date of Patent: Aug. 24, 2021

(54) DATA PROTECTION OF CONTAINER PERSISTENT STORAGE WITH CHANGED BLOCK TRACKING

(71) Applicant: Quantum Corporation, San Jose, CA (US)

(72) Inventors: Greg Wade, San Jose, CA (US); Gerald Simon, San Jose, CA (US); Barry Herman, San Jose, CA (US)

(73) Assignee: Quantum Corporation, San Jose, CA (US)

(*) Notice: Subject to any disclaimer, the term of this patent is extended or adjusted under 35 U.S.C. 154(b) by 148 days.

(21) Appl. No.: 16/146,358

(22) Filed: Sep. 28, 2018

(65) Prior Publication Data

US 2019/0095102 A1 Mar. 28, 2019

Related U.S. Application Data

(60) Provisional application No. 62/564,433, filed on Sep. 28, 2017.

(51) Int. Cl.
*G06F 3/06* (2006.01)

(52) U.S. Cl.
CPC ............ *G06F 3/065* (2013.01); *G06F 3/0619* (2013.01); *G06F 3/0644* (2013.01); *G06F 3/0653* (2013.01); *G06F 3/0673* (2013.01); *G06F 3/0685* (2013.01)

(58) Field of Classification Search
CPC ...... G06F 3/0619; G06F 3/0644; G06F 3/065; G06F 3/0653; G06F 3/0673; G06F 3/0685; G06F 11/1446; G06F 11/1448; G06F 11/1451; G06F 11/1458

USPC .......................... 711/162; 707/644, 645, 647
See application file for complete search history.

(56) References Cited

U.S. PATENT DOCUMENTS

| | | | | |
|---|---|---|---|---|
| 7,681,069 B1* | 3/2010 | Chellappa | ........... | G06F 11/1435 711/161 |
| 8,495,037 B1* | 7/2013 | Westenberg | ........ | G06F 11/1448 707/698 |
| 9,489,267 B1* | 11/2016 | Patwardhan | ............ | G06F 3/065 |
| 2010/0077160 A1* | 3/2010 | Liu | ..................... | G06F 11/1453 711/162 |
| 2013/0080397 A1* | 3/2013 | Payne | ................. | G06F 11/1469 707/681 |

(Continued)

*Primary Examiner* — Reginald G Bragdon
*Assistant Examiner* — Aaron D Ho
(74) *Attorney, Agent, or Firm* — Eschweiler & Potashnik, LLC (57) ABSTRACT

Embodiments include methods, apparatus, or processors configured to access a tracking enabled storage volume associated with a container; perform a full backup of the storage volume, where performing the full backup includes defining a full backup point; perform a first incremental backup of the storage volume based on the full backup point, where performing the first incremental backup includes defining a current backup point; determine whether a backup termination condition has been met; upon determining that the backup termination condition has not been met: performing a subsequent incremental backup of the storage volume based on the current backup point; and updating the current backup point. Embodiments may restore the tracking enabled storage volume from the full backup and the incremental backups.

19 Claims, 7 Drawing Sheets

(56) References Cited

U.S. PATENT DOCUMENTS

2016/0004721 A1* 1/2016 Iyer ................... G06F 16/184
                                                707/649
2016/0147607 A1* 5/2016 Dornemann ......... G06F 16/188
                                                711/162
2017/0371547 A1* 12/2017 Fruchtman ......... G06F 11/1448
2018/0189145 A1* 7/2018 Borate ................ G06F 16/128
2018/0285203 A1* 10/2018 Cox ................... G06F 11/1464

* cited by examiner

DATA PROTECTION OF CONTAINER PERSISTENT STORAGE WITH CHANGED BLOCK TRACKING

CROSS REFERENCE TO RELATED APPLICATIONS

This application claims the benefit of U.S. Provisional Application 62/564,433 filed Sep. 28, 2017, which is incorporated herein in its entirety.

BACKGROUND

Containers have become ubiquitous in computing environments. The widespread adoption of containers is motivated by their ease of deployment, granularity of applications, and because containers may require fewer resources than virtual machines in similar configurations. A container is a lightweight, stand-alone, executable package of a piece of software that includes everything needed to run it. A container typically includes code, runtime, system tools, system libraries, and settings. Containers isolate software from its surroundings. For example, containers help mitigate differences between development environments and staging environments.

Existing methods for protecting persistent storage associated with containers are quite limited. One existing approach for protecting persistent storage associated with containers includes saving an entire storage volume that a container uses as its persistent storage. Saving an entire storage volume is effectively taking a Full backup of the storage volume, in data protection terminology. The requirement of taking a Full backup of such volumes is quite burdensome, because of the time and resources required for each backup. Each backup not only can take a significant amount of time, but can also consume excessive amounts of CPU, I/O and network overhead.

Another existing approach for protecting persistent storage associated with containers is to embed a traditional backup agent within a container. However, embedding a traditional backup agent within a container violates the basic principles of micro services or microservice architecture. Micro services or microservice architecture are directed toward implementing only one domain concept or a single process in, for example, a container, and thus embedding a traditional backup agent within a container is not appropriate for storage volume backups.

A further existing approach for backing up containers is the use of volume snapshots. Volume snapshots require that a snapshot be held for the duration of the time between backups. As a result, snapshots must be maintained perpetually if backups are required. The existence of snapshots creates indirection for blocks and induces latency when reading blocks. This may be proportional to the number of snapshots. Thus, volume snapshots are not an optimal solution to the problem of backing up containers.

DETAILED DESCRIPTION

Figure 1:
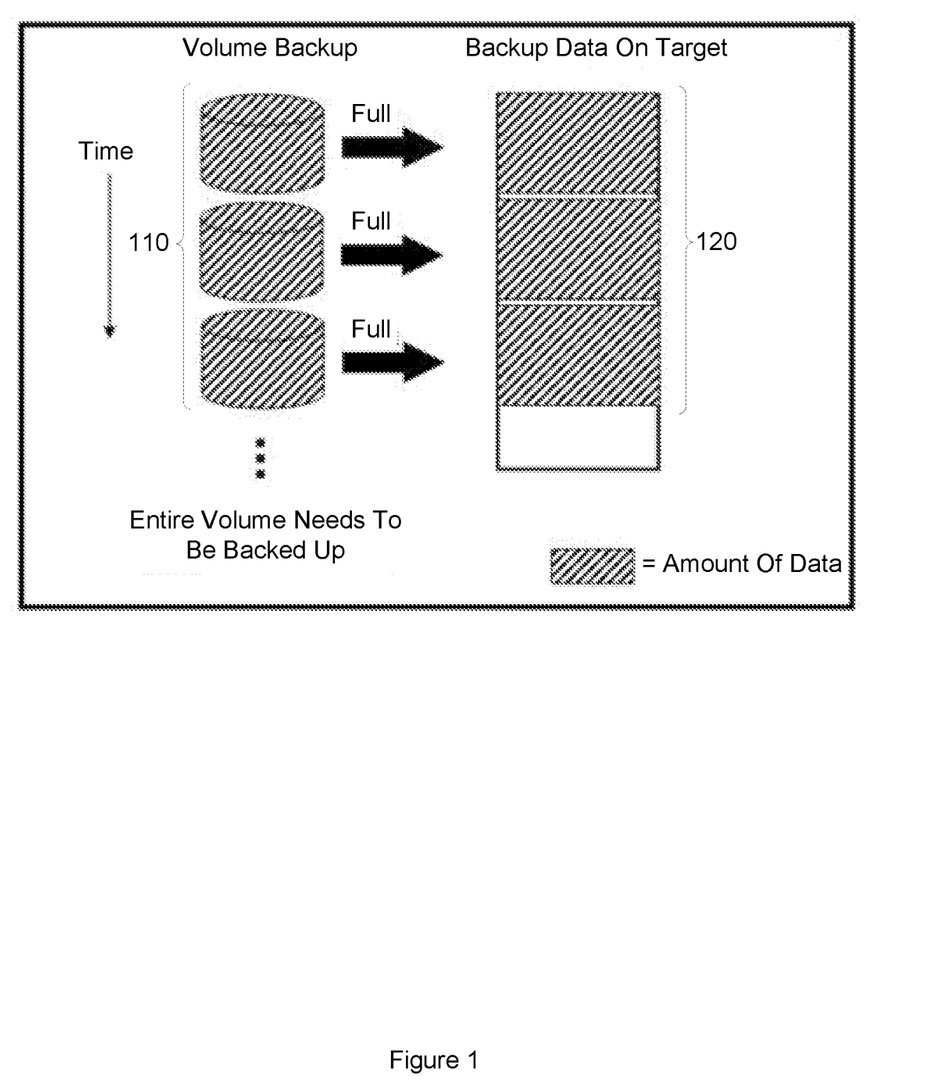
FIG. 1 illustrates an existing approach to backing up data in a container environment.

Existing approaches to protecting data in container persistent storage require that entire storage volumes associated with the container need to be backed up. FIG. 1 illustrates an existing approach to protecting data in container persistent storage. FIG. 1 illustrates a series of Full backups 110 of a volume. In an existing container environment, each of these volume backups must be a Full backup. The right side of FIG. 1 illustrates the amount of data 120 that must be read from the source system and written to the target system that is receiving the backup data. As indicated in FIG. 1, in an existing approach, all the data of Full backups 110 must be read from the source system and written to the target system. While such a system may provide backup capability, it is not optimal in terms of time, resources, CPU utilization, I/O, or network overhead. For example, unchanged data may be repeatedly copied and backed up to the target system.

Embodiments described herein facilitate a more efficient way to protect data of container persistent storage compared to existing approaches. Example embodiments significantly reduce the time and resources required for backup of data stored in container persistent storage compared to existing approaches. Embodiments facilitate providing a more efficient incremental method that prevents the use of excessive amounts of CPU, I/O and network bandwidth. Example embodiments limit the amount of data movement to only the data that changed since the previous backup.

In one embodiment, a Changed Block Tracking (CBT) technique is employed for container persistent storage. When CBT is used in container volume storage, the changes that applications make to the storage (i.e., to blocks stored in the storage) may be tracked. A backup application may then query a CBT mechanism, component, or circuitry configured to implement a CBT technique, for the blocks that have changed, and limit backup to only those blocks that have experienced change. This approach can be used repeatedly, to perform highly efficient incremental backups of the storage that existing approaches are unable to perform. CBT may be employed by embodiments described herein to efficiently identify differences between two points in time of a container persistent storage volume. Embodiments may also employ CBT approaches as described herein for container volume data protection, including backup, replication, cloning, archiving, or security scanning.

Embodiments may provide for data protection of container persistent storage with changed block tracking by creating a change tracking-enabled storage volume by using the CBT component. Embodiments may then associate this tracking-enabled storage volume with a container. Embodiments may then perform a Full backup by reading the entire storage device to produce a base image that will be combined with incremental CBT images at recovery time. Embodiments may then begin tracking of changes, by identifying the point where the Full backup was taken. In one embodiment, a snapshot of a persistent storage volume may be taken. Embodiments may then perform an Incremental backup by querying the CBT component for changes that have occurred since the Full backup. Embodiments then read only those blocks that have changed, and write the changed blocks to a target backup device. Embodiments may then persist the current tracking point that is associated with the previous Incremental backup. Embodiments may then perform the next Incremental backup, by using the previous Incremental backup's tracking point to define the point from which to identify changed blocks and back up only those changed blocks that have changed since the previous Incremental backup. Embodiments may then persist the tracking point of the latest Incremental backup. Embodiments may repeat performing the next Incremental backup, and persisting the tracking point of the latest Incremental backup, based upon a backup schedule, a policy, a user preference, or other criterion. In one embodiment, a recovery process may be implemented, using the Full backup and the subsequent Incremental backups. Thus, embodiments may perform iterative Incremental backups of container persistent storage.

Figure 2:
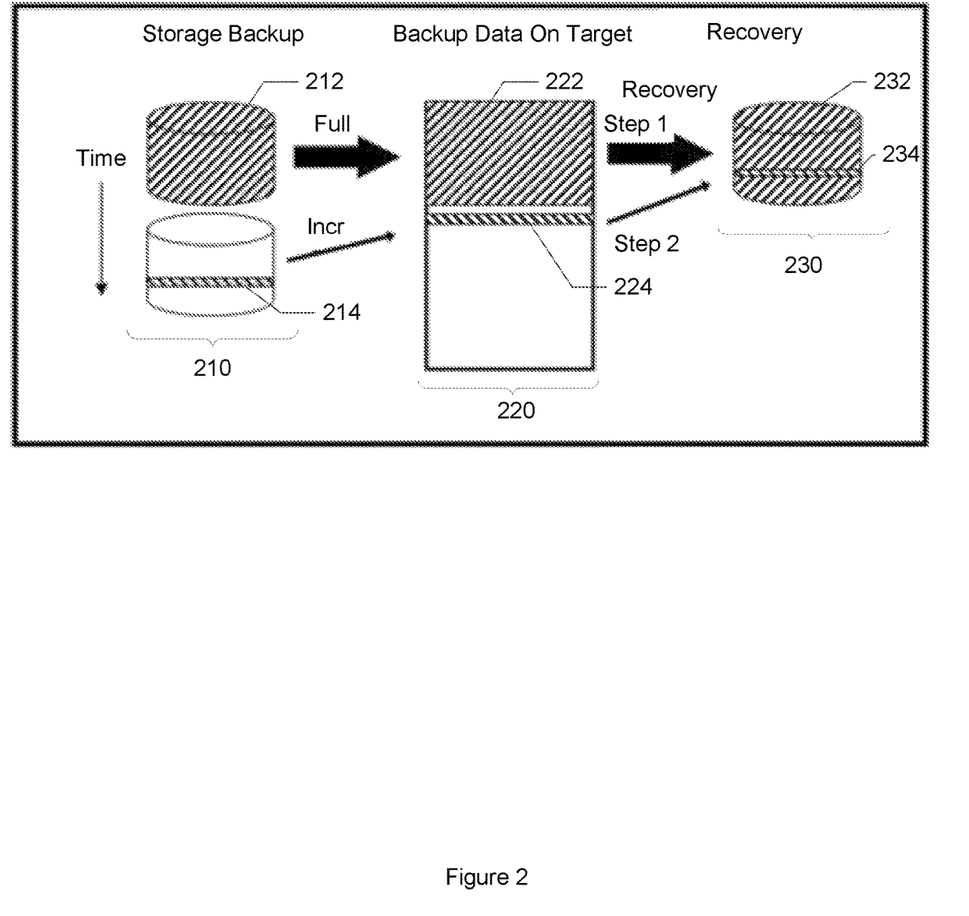
FIG. 2 illustrates an example efficient incremental backup and recovery approach.

FIG. 2 is a workflow diagram of one example embodiment of providing data protection of container persistent storage with CBT by creating a change tracking-enabled storage volume by using a CBT component, and limiting incremental backups to only the data that has changed since the previous backup. FIG. 2 illustrates a series of backups 210, starting with a Full backup 212 and followed by Incremental backups 214. In embodiments described herein, the amount of data movement during the Incremental backups 214 is significantly reduced to only the data that was changed since the previous backup. For example, a first incremental backup may only backup data that has changed since the point at which the Full backup was made, and a second, subsequent incremental backup may only backup data that has changed since the first incremental backup. Thus, the backup data on backup storage target 220, which includes the data 222 backed up from Full backup 212, and the data 224 backed up from Incremental backups 214, is much less than required by the existing approach illustrated in FIG. 1. Similarly, the recovery data that needs to be read from the target device, which includes recovered Full backup data 232 and recovered Incremental data 234, is much less than that required by the existing approach illustrated in FIG. 1. Embodiments described herein thus provide a significant improvement over the much larger data movement of the existing approach illustrated FIG. 1, which requires the entire storage device to be read and written during each backup.

The recovery process is shown on the right side of FIG. 2. This recovery process follows an approach where, at Step 1, the Full backup 222 is read from the backup storage target 220 and written to the recovery storage area 230 as recovered Full backup data 232. Once this Full backup is recovered, at Step 2, subsequent Incremental backups 224 may be read from the backup data on backup storage target 220 and written to the recovery area 230 as recovered Incremental data 234. In one embodiment, there may be further optimizations to reduce the amount of data read from the Full backup 222. For example, embodiments may reduce the amount of data read from the Full backup 222 by not reading the extents of the Full backup 222 that are present in later Incremental backups.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, calculating, determining, and so on, refer to actions and processes of a computer system, logic, circuit, processor, or similar electronic device that manipulates and transforms data represented as physical (electronic) quantities.

Example methods and operations may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 3:
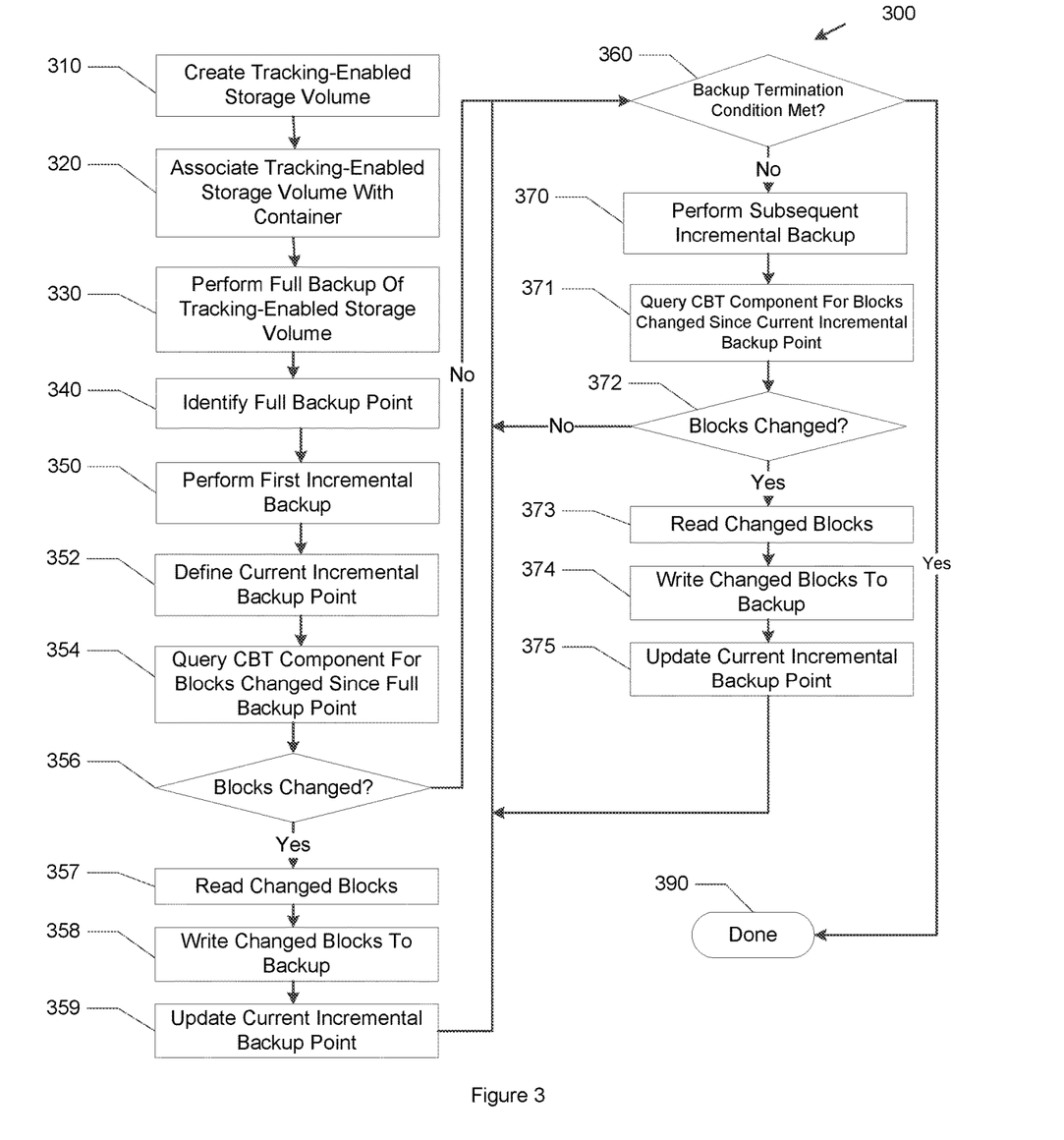
FIG. 3 is a flow diagram of operations for providing data protection of container persistent storage with changed block tracking.

FIG. 3 is a flow diagram of example operations 300 that may be performed by a processor for providing changed block tracking for data protection of container persistent storage. A processor(s) may include any combination of general-purpose processors and dedicated processors (e.g., graphics processors, application processors, etc.). The processors may be coupled with or may include memory or storage and may be configured to execute instructions stored in the memory or storage to enable various apparatus, applications, or operating systems to perform the operations. The memory or storage devices may include main memory, disk storage, or any suitable combination thereof. The memory or storage devices may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, or solid-state storage.

The set of operations 300 includes, at 310, creating a tracking-enabled storage volume. The tracking-enabled storage volume includes a Changed Block Tracking (CBT) component. Creating a tracking-enabled storage volume that includes a CBT component may include overlaying an existing block storage device with a CBT block storage device that encapsulates the semantics of the CBT functionality. For example, the Lunix Device Mapper can overlay RAID semantics on block devices that do not provide RAID capability. The CBT component is configured to monitor write operations to the volume, and to record or track the volume extents these write occur in. The CBT component may accumulate the list of volume extents that are changed over time, and associate them with a specific snapshot or other mechanism. A CBT component may include, for example, circuitry or other means configured to monitor write operations to a volume, and maintain a list of such changes. The CBT component is configured to query this list of changed extents, in order for a backup application to identify the extents that need to be included in an Incremental backup. For example, VMWave provides a CBT mechanism and the Linux Device Mapper provides a CBT mechanism that is called dm_era. A CBT mechanism or component consists of internal meta data which can be used to note whether a block has changed between 2 CBT points. A CBT mechanism or component differs from copy on write (COW) snapshots because it does not preserve the intermediary contents of the block. For CBT the contents only matter at the time that a backup is being done. A storage volume may include, for example, a storage device, including a fixed disk, floppy disk, a CD-ROM, a solid-state device (SSD), a cloud storage device, or other electronic data storage medium that is formatted to store directories and files, including blocks of data. A storage volume may be formatted for use by a particular media-based file system, such as NTFS, FAT, CDFS, or other file system. A storage volume may include an object that represents a logical volume to a data storage system.

The set of operations 300 also includes, at 320, associating the tracking-enabled storage volume with a container. A container is a lightweight, stand-alone, executable package of a piece of software that includes everything needed to run it. A container may include code, runtime, system tools, system libraries, or settings. Associating the tracking-enabled storage volume with the container may include using the functions provided by an Operating System with which embodiments may be implemented. Embodiments may use these functions because the tracking-enabled storage volume may be configured in a manner that is transparent to said functions. For example, container orchestrators such as Kubernetes have mechanisms for provisioning persistent storage and associating it with a container instance. The provisioning part is called flexvolumes for Kubernetes. The persistent association is controlled by YAML files. This is just one example. Embodiments may employ these, or other techniques. For example, the CNCF (Cloud Native Compute Foundation) provides a mechanism called CSI (Container Storage Interface) for provisioning and associating persistent storage with container instances.

The set of operations 300 also includes, at 330, performing a Full backup of the tracking-enabled storage volume by reading the tracking-enabled storage volume. In one embodiment, reading the tracking-enabled storage volume may include reading the entire tracking-enabled storage volume. In another embodiment, reading the tracking-enabled storage volume may include reading less than the entire tracking-enabled storage volume. For example, certain blocks in the tracking-enabled storage volume may be unsuitable for reading because, for example, they are corrupted or contain malicious code, or for other reasons.

The storage volume may be backed up to a target backup device. The target backup device may be, for example, a disk drive, a linear tape open (LTO) data storage device, a solid state storage device (SSD), a RAM, a ROM, a cloud storage system, or other type or combination of electronic data storage devices. The target backup device may be, for example, a tiered storage system, and may use tape drives, local disk drives, or SSDs to store a file, to store information about a file, to store redundant copies of files, or to store other electronic data, including blocks of data.

Backing up the tracking-enabled storage volume may include writing the entire storage volume to the target backup device. In one embodiment, backing up the tracking-enabled storage volume may include writing less than the entire storage volume to the target backup device. For example, certain blocks in the tracking-enabled storage volume may be unsuitable for full backup because, for example, they are corrupted or contain malicious code, or for other reasons. Thus, a full backup may include backing up less than all the data in a storage volume.

The set of operations 300 also includes, at 340, defining a full backup point. Defining the full backup point includes identifying a point in time at which the full backup was taken. The full backup point may, in one embodiment, be a timestamp, or other indication of the time at which the full backup was taken. Defining the full backup point may include, for example, writing a value into a pointer, writing a value into a variable, storing an address in a register, or other action.

The set of operations 300 also includes, at 350, performing a first incremental backup of the tracking-enabled storage volume. The first incremental backup may be performed at a time after the point in time at which the full backup was taken. Performing the incremental backup includes, at 352, defining a current incremental backup point. The current incremental backup point may be, for example, a timestamp, which indicates a time at which the current incremental back is performed. Defining a current incremental backup point may include, for example, writing a value into a pointer, writing a value into a variable, storing an address in a register, or other actions.

Performing the first incremental backup also includes, at 354, querying the CBT component for blocks in the tracking-enabled storage that have changed since the full backup point. A block may have changed due to a write operation, a delete operation, or other operation that modifies the content of the block. The CBT component may return a list of blocks that have changed, or may return a signal that blocks have changed. Performing the incremental backup also includes, at 356, determining if blocks have changed in the tracking-enabled storage volume since the full backup point. Upon determining that blocks have changed, performing the incremental backup also includes, at 357, reading the blocks that have changed. Reading the blocks that have changed may include acquiring electronic data, reading from a computer file, receiving a computer file, reading from a computer memory, or other computerized activity.

Performing the incremental backup also includes, at 358, writing the blocks that have changed to a target backup device. The target backup device may be, for example, the same target backup device that the full backup was stored on, or may be another, different target backup device, including a disk drive, an LTO data storage device, an SSD, a RAM, a ROM, a cloud storage system, or other type or combination of electronic data storage devices. Writing the blocks that have changed may include acquiring electronic data, reading from a computer file, receiving a computer file, reading from a computer memory, writing to a computer file, writing to a computer memory, or other computerized activity Performing the incremental backup also includes, at 359, updating the current incremental backup point. Updating the current incremental backup point may include, for example, writing a value into a pointer, writing a value into a variable, storing an address in a register, or other actions.

The set of operations 300 also includes, at 360, determining whether a backup termination condition has been met. Upon determining that the backup termination condition has not been met, embodiments may iteratively perform subsequent incremental backups. Embodiments may iteratively perform subsequent incremental backups according to a schedule, a policy, a user command, or according to other conditions or instructions. For example, a backup policy may indicate to perform incremental backups until the container is no longer in use, or until a period of time (e.g., 1 hour, 1 day) has elapsed since the full backup was taken. Upon determining that the backup termination condition has been met, embodiments may terminate the incremental backup process at 390, or perform other actions.

The set of operations 300 also includes, at 370, upon determining that the backup condition has not been met, performing a subsequent incremental backup. Performing the subsequent incremental backup may include, at 371, querying the CBT component for blocks in the tracking-enabled storage volume that have changed since the current incremental backup point (i.e., since the previous incremental backup was taken). Performing the subsequent incremental backup also includes determining at 372 if blocks have changed in the tracking-enabled storage volume since the previous incremental backup. Upon detecting that blocks have changed since the previous incremental backup, performing the subsequent incremental backup also includes, at 373, reading the blocks that have changed. Performing the subsequent incremental backup also includes, at 374, writing the blocks that have changed to the target backup device. Performing the subsequent incremental backup further includes, at 375, updating the current incremental backup point. Updating the current incremental backup point may include, for example, updating the timestamp set at 352 with an updated timestamp that indicates the time at which the most recent subsequent incremental backup was taken. Upon updating the current incremental backup point, embodiments may return to block 360, or may terminate, or may perform other actions.

While FIG. 3 illustrates an embodiment of operations 300 in which steps of the operations are performed once, in one embodiment, steps of operations 300 may be performed multiple times. For example, in one embodiment, a differential backup approach may be employed, wherein multiple subsequent incremental backups may be made, where for each iteration of multiple subsequent incremental backups, an earlier subsequent incremental backup's tracking point is used to identify a list of changed blocks.

In another embodiment, operations 300 may also include additional steps. For example, knowledge gained from a container engine or orchestrator associated with the container may be used to determine whether a storage volume has been assigned to the container since the last backup. If a storage volume has not been assigned to the container since the last backup, then there is no reason to back it up until the next time it is assigned. If a storage volume has been assigned to the container since the last backup, then the newly assigned storage volume may be backed up according to embodiments described herein.

In another embodiment, knowledge from the container engine, orchestrator, or registry may be employed to classify the type of data likely to be contained within the storage volume. Embodiments may then determine how to treat the backup data. For example, if it is determined from the container engine, orchestrator, or registry, that the container implements an email server, and there is a legal hold in effect, then data retention should be infinite until the legal host is removed. In other embodiments, other classifications or approaches to treating the backup data may be employed.

In one example, an operation or a method may be implemented as computer executable instructions. Thus, in one example, a computer-readable storage device may store computer executable instructions that if executed by a machine (e.g., computer, processor) cause the machine to perform methods or operations described or claimed herein including operations 300, 400, method 600, or any other methods or operations described herein. While executable instructions associated with the listed methods are described as being stored on a computer-readable storage device, it is to be appreciated that executable instructions associated with other example methods or operations described or claimed herein may also be stored on a computer-readable storage device. In different embodiments the example methods or operations described herein may be triggered in different ways. In one embodiment, a method or operation may be triggered manually by a user. In another example, a method or operation may be triggered automatically.

Figure 4:
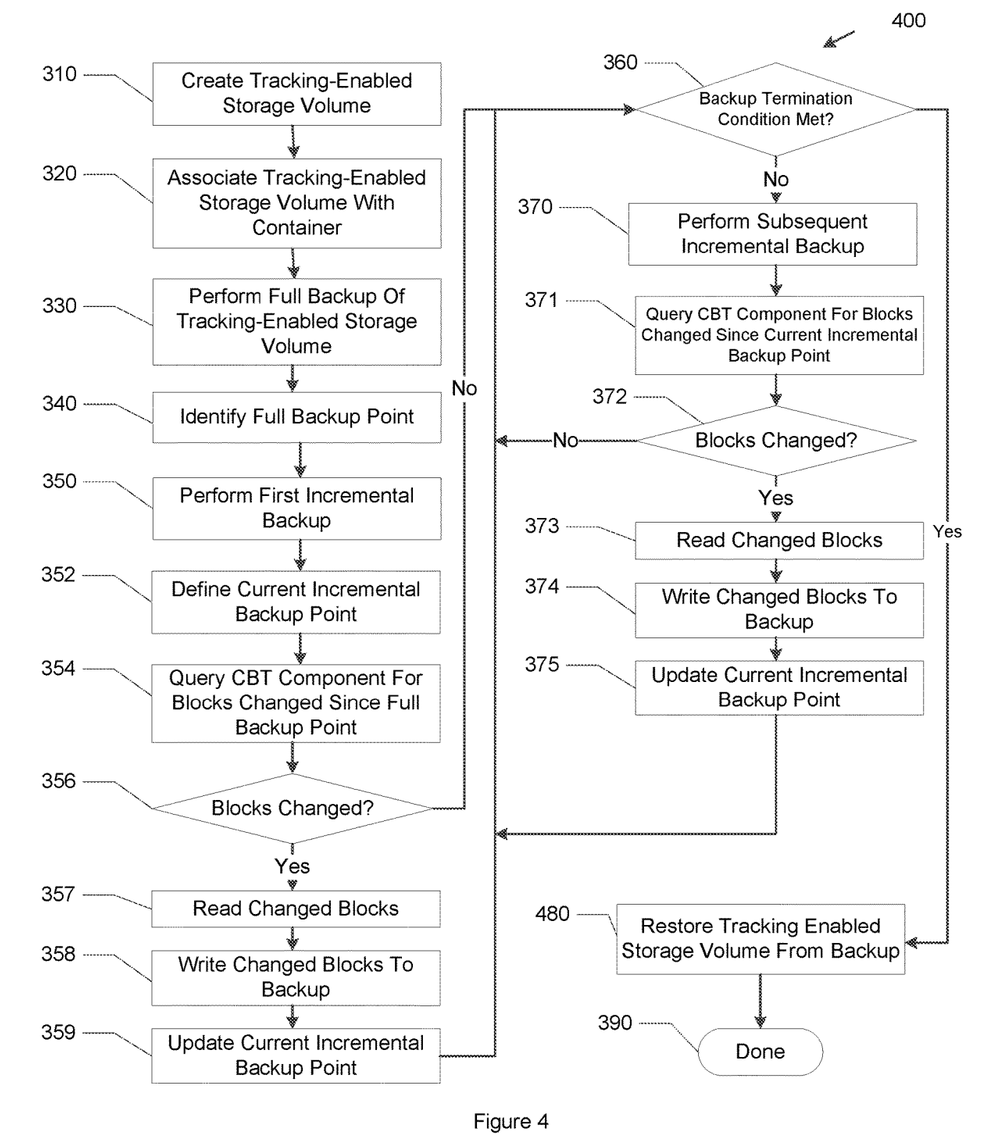
FIG. 4 is a flow diagram of operations for providing data protection of container persistent storage with changed block tracking.

FIG. 4 is a flow diagram of example operations 400 that may be performed by a processor for providing changed block tracking for data protection of container persistent storage. Operations 400 are similar to operations 300, but include additional steps and details. The set of operations 400 includes, at 480, restoring the storage volume from the full backup and at least one of the incremental backup or the subsequent incremental backup.

In one embodiment, restoring the storage volume from the full backup and at least one of the incremental backup or the subsequent incremental backup includes reading the full backup from the target backup device. Restoring the storage volume also includes writing the full backup to a recovery storage device. Restoring the storage volume also includes reading at least one of the first incremental backup or the subsequent incremental backup from the target backup device. Restoring the storage volume further includes writing the at least one of the first incremental backup or the subsequent incremental backup to the recovery storage device. The recovery storage device may be, for example, a disk drive, an LTO data storage device, an SSD, a RAM, a ROM, a cloud storage system, or other type or combination of electronic data storage devices.

In one embodiment, restoring the storage volume from the full backup and at least one of the incremental backup or the subsequent incremental backup includes determining which extents of the full backup are present in an incremental backup, and reading only those extents not present in an incremental backup from the full backup from the target backup device. In this embodiment, restoring the storage volume also includes writing only those extents not present in an incremental backup that were read from the full backup from the target backup device to the recovery storage device.

Figure 5:
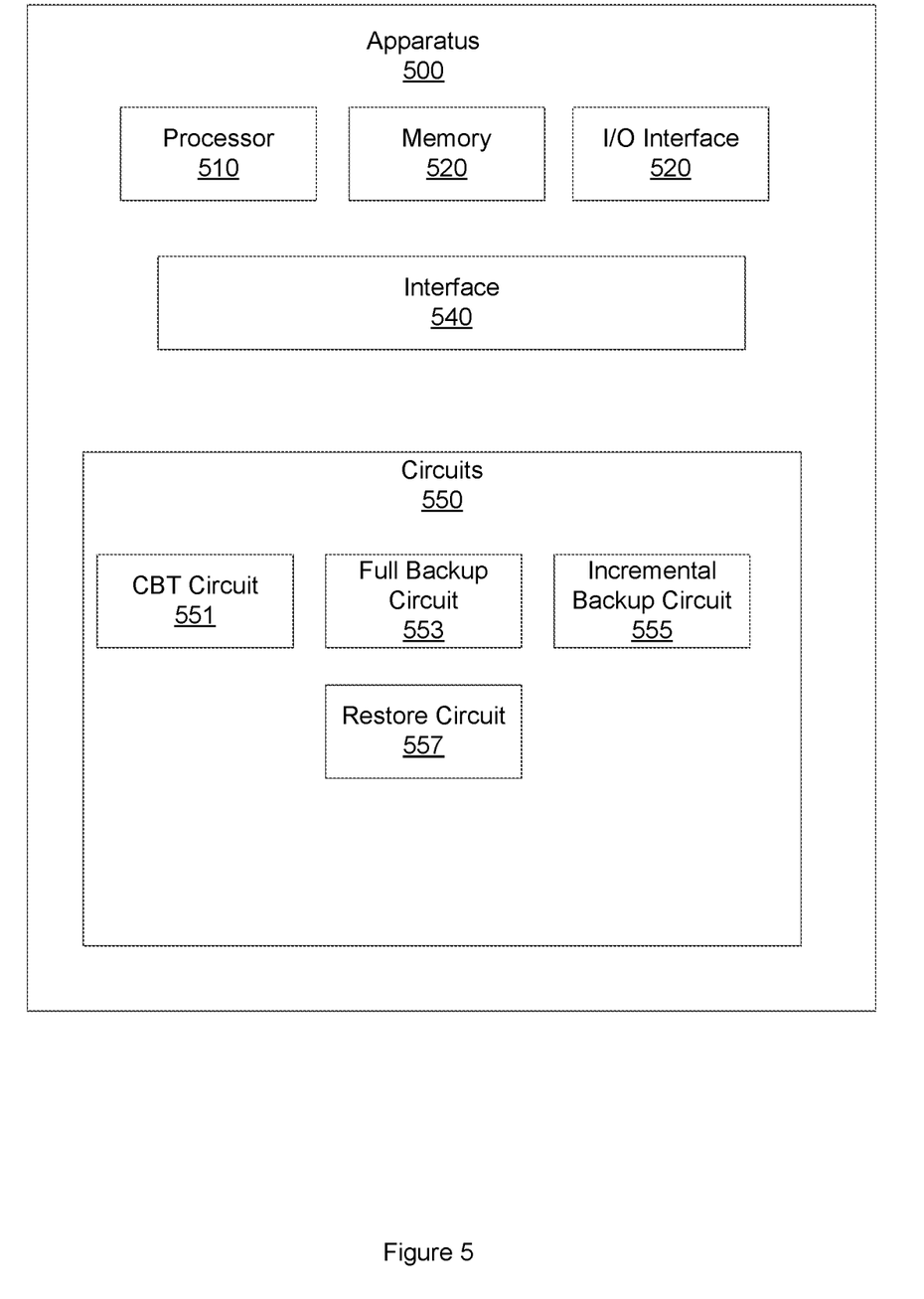
FIG. 5 illustrates an example apparatus configured to provide data protection of container persistent storage with changed block tracking.

FIG. 5 illustrates an example apparatus 500 for providing data protection of container persistent storage with changed block tracking. Apparatus 500 includes a processor 510, a memory 520, an input/output (I/O) interface 530, and a set of circuits 550 that is connected to the processor 510, memory 520, I/O interface 530 by an interface 540. The memory 520 may be configured to store metadata associated a container, with blocks, or changed blocks. In one embodiment, processor 510, memory 520, and the set of circuits 550 facilitate providing data protection of container persistent storage with changed block tracking.

The set of circuits 550 includes a CBT circuit 551 configured to create a tracking enabled storage volume. CBT circuit 551 is also configured to associate the tracking-enabled storage volume with a container. Associating the tracking-enabled storage volume with the container may include, for example, assigning an identification value associated with the container to the tracking-enabled storage volume, or other action for associating the container with the tracking-enabled storage volume as described herein. CBT circuit 551 is further configured to determine if a block of data stored in the tracking enabled storage volume has been changed. CBT circuit 551 may be configured to determine if a block of data stored in the tracking enabled storage volume has been changed using a volume plugin configured to monitor write operations to the volume. When these writes are performed, the volume plugin is configured to record the volume extents that are changed. In one embodiment, CBT circuit 551 may be configured to determine if a block of data stored in the tracking enabled storage volume has been changed using a block bitmap where one bit represents one storage block.

The set of circuits 550 also includes a Full backup circuit 553 configured to perform a Full backup of the tracking enabled storage volume. In one embodiment, performing a full backup includes reading the entire tracking enabled storage volume and writing the read data to a target storage device. The target storage device may be, for example, a disk drive, an LTO data storage device, an SSD, a RAM, a ROM, a cloud storage system, or other type or combination of electronic data storage devices. In another embodiment, performing a full backup includes reading less than the entire tracking enabled storage volume, and writing the read data to the target storage device. Full backup circuit 553 is also configured to identify a point in time when a full backup was taken.

The set of circuits 550 also includes an incremental backup circuit 555 configured to perform an incremental backup of the tracking enabled storage volume. Incremental backup circuit 555 is configured to define a current backup point, query CBT circuit 551 for changes that have occurred to blocks stored on the tracking enabled storage volume since the Full backup, and, upon detecting that blocks have changed, to read the blocks that have changed, and write the blocks that have changed to a target backup device. Incremental backup circuit 555 is also configured to update the current incremental backup point.

In one embodiment, incremental backup circuit 555 is configured to perform the first Incremental backup based on the full backup point by defining a current incremental backup point; querying the CBT 551 circuit for blocks that have changed in the tracking-enabled storage volume since the full backup point; upon detecting that blocks have changed in the tracking-enabled storage volume since the full backup point: reading the blocks that have changed; writing the blocks that have changed to a target backup device; and updating the current incremental backup point.

Incremental backup circuit 555 is further configured to perform subsequent incremental backups. In one embodiment, incremental backup circuit 555 is configured to determine whether a backup termination condition has been met. Upon determining that the backup termination condition has not been met, incremental backup circuit 555 is configured to query CBT circuit 551 for blocks stored in the tracking-enabled storage volume that have changed since the current incremental backup point. Incremental backup circuit 555 is configured to, upon detecting that a block has changed in the tracking enabled storage volume since the current incremental backup point, read the blocks that have changed. Incremental backup circuit 555 is also configured to write the blocks that have changed to a target backup device. Incremental backup circuit 555 is further configured to update the current incremental backup point.

The set of circuits also includes a restore circuit 557. Restore circuit 557 is configured to restore the tracking-enabled storage volume from the full backup and at least one of the first incremental back and subsequent incremental backup.

In one embodiment, restore circuit 557 is configured to read the full backup from the target backup device; write the full backup to a recovery storage device; read at least one of the first incremental backup or the subsequent incremental backup from the target backup device; and write the at least one of the first incremental backup or the subsequent incremental backup to the recovery storage device.

In another embodiment, restore circuit 557 is configured to determine which data in the full backup is not present in the first incremental backup or the subsequent incremental backup; read the data in the full backup that is not present in the first incremental backup or the subsequent incremental backup from the target backup device; write the data in the full backup that is not present in the first incremental backup or the subsequent incremental backup to a recovery storage device; read at least one of the first incremental backup or the subsequent incremental backup from the target backup device; and write the at least one of the first incremental backup or the subsequent incremental backup to the recovery storage device. The recovery storage device may be, for example, a disk drive, an LTO data storage device, an SSD, a RAM, a ROM, a cloud storage system, or other type or combination of electronic data storage devices.

Embodiments described herein, including operations 300 and 400, apparatus 500, and method 600, may be employed in various container environments or implementations. For example, embodiments described herein may be, but are not limited to being, employed with a CoreOS Rkt Torus flex volume library, CoreOS Operators, Docker Storage Volume Plugins, Docker Infinit, EMC libStorage, Kubernetes Volumes, Mesosphere Container 2.0, Rancher Labs Convoy, Red Hat Java Middleware or CNCF CSI (Container Storage Interface) volumes. Embodiments described herein also facilitate accelerated block zero'ing, thinning, and hardware assisted snapshots. Embodiments described herein also may be employed with delta change metrics, a deduplicating buffer cache, container volumes, provisioning and metrics on a per container volume basis, host based flash caching with networked storage, or synchronous COW driven replication. Embodiments described herein may be implemented using a hyper converged, hyper scale, software defined, elastic, or declarative architecture.

Figure 6:
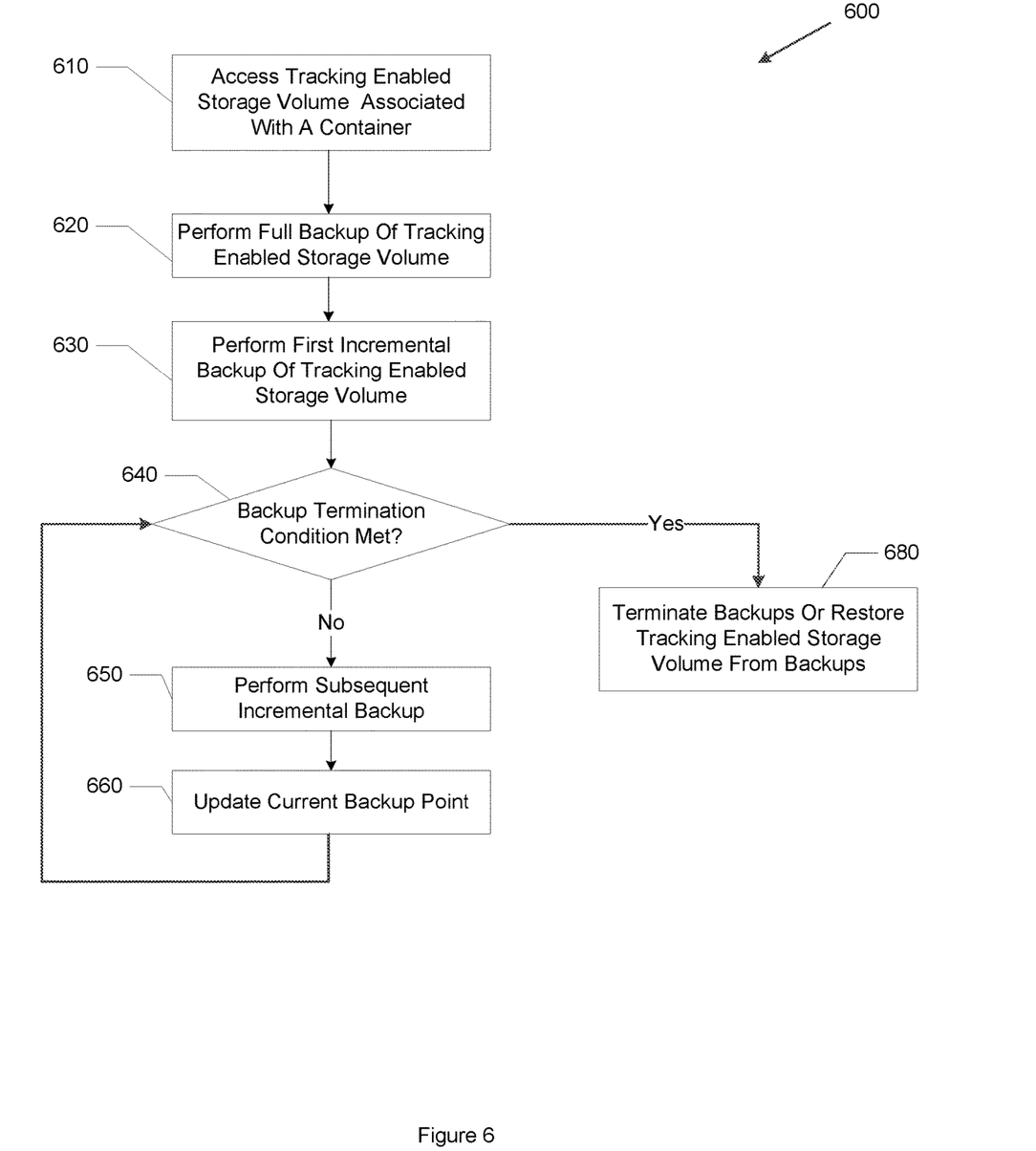
FIG. 6 illustrates an example method for providing data protection of container persistent storage with changed block tracking.

FIG. 6 illustrates an example method 600 for providing data protection of container persistent storage with changed block tracking. Method 600 includes, at 610, accessing a tracking enabled storage volume associated with a container. Accessing the tracking enabled storage volume includes acquiring electronic data, reading from a computer file, receiving a computer file, reading from a computer memory, or other computerized activity.

Method 600 also includes, at 620, performing a full backup of the storage volume. Performing the full backup includes defining a full backup point, where the full backup point identifies a point in time at which the full backup was performed. Performing the full backup includes writing data from the tracking enabled storage to a target storage device. The target storage device may be, for example, a tiered storage system, and may use tape drives, local disk drives, or solid state drives (SSD) to store a file, to store information about a file, to store redundant copies of files, or to store other electronic data, including blocks of data.

Method 600 also includes, at 630, performing a first incremental backup of the storage volume based on the full backup point. Performing the first incremental backup includes defining a current backup point. The current backup point identifies a point in time at which the first incremental back is performed. Performing the first incremental backup includes reading data that has changed in the storage volume since the full backup, and writing the changed data to the target storage device.

Method 600 also includes, at 640, determining whether a backup termination condition has been met. Determining whether a backup termination condition has been met may include, for example, consulting a backup policy, which may indicate whether to perform incremental backups until the container is no longer in use, or until a period of time (e.g., 1 hour, 1 day) has elapsed since the full backup was taken. Other backup termination conditions may be employed.

Upon determining that the backup termination condition has not been met, method 600 includes, at 650, performing a subsequent incremental backup of the storage volume based on the current backup point. Performing the subsequent incremental backup includes determining which, if any, blocks stored in the tracking enabled storage volume have changed since the previous incremental backup, reading the changed blocks, and writing the changed blocks to the target storage device. Method 600 further includes, at 651 updating the current backup point. Updating the current backup point includes identifying a point in time at which the subsequent incremental backup is performed, and updating the current backup point with the time at which the subsequent incremental backup is performed.

In one embodiment, method 600 further includes, at 680, terminating the backup process, or restoring the storage volume. Restoring the storage volume includes restoring the storage volume from the full backup and at least one of the first incremental backup and the subsequent incremental backup. Restoring the storage volume from the full backup and at least one of the first incremental backup and the subsequent incremental backup may include writing the full backup and at least one of the first incremental backup and the subsequent incremental backup to a recovery storage device.

Figure 7:
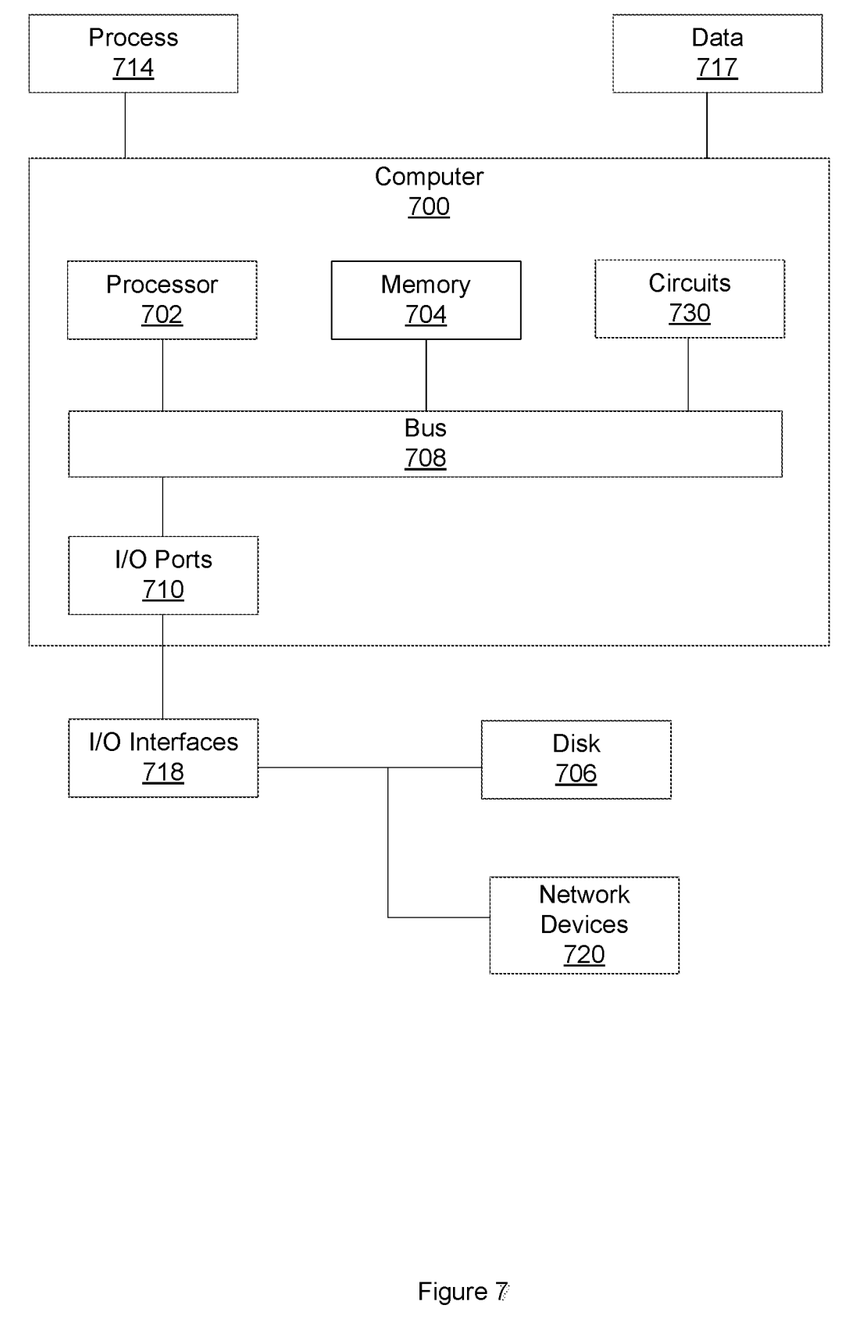
FIG. 7 illustrates an example computer in which embodiments may operate.

FIG. 7 illustrates an example computing device in which example operations, systems, apparatus, and methods described herein, and equivalents, may operate. The example computing device may be a computer 700 that includes a processor 702, a memory 704, and input/output ports 710 operably connected by a bus 708. In one example, the computer 700 may include a circuit 730 configured to facilitate providing data protection of container persistent storage volumes with changed block tracking. In different examples, circuit 730 may be implemented in hardware, software, firmware, and/or combinations thereof. While circuit 730 is illustrated as a hardware component attached to the bus 708, it is to be appreciated that in one example, circuit 730 could be implemented in the processor 702.

Thus, circuit 730 may provide means (e.g., hardware, software, firmware) for creating a tracking-enabled storage volume, where the tracking-enabled storage volume includes a CBT component, and means for associating the tracking-enabled storage volume with a container. Circuit 730 may also provide means for performing a full backup of the tracking-enabled storage volume; and generating a full backup point that identifies a point in time when the full backup was taken.

Circuit 730 may also provide means (e.g., hardware, software, firmware) for performing a first incremental backup of the tracking-enabled storage volume. Performing the first incremental backup may include defining a current incremental backup point, and querying the CBT component for blocks that have changed in the tracking-enabled storage volume since the full backup point. Circuit 730 may also provide means for, upon detecting that blocks have changed in the tracking-enabled storage volume since the full backup point, reading the blocks that have changed, writing the blocks that have changed to a target backup device, and updating the current incremental backup point.

Circuit 730 may also provide means (e.g., hardware, software, firmware) for determining whether a backup termination condition has been met, and upon determining the backup termination condition has not been met: performing a subsequent incremental backup of the tracking-enabled storage volume. Performing the subsequent incremental backup may include querying the CBT component for blocks that have changed in the tracking-enabled storage volume since the current incremental backup point, upon detecting that blocks have changed in the tracking-enabled storage volume since the current incremental backup point: reading the blocks that have changed, writing the blocks that have changed to the target backup device, and updating the current incremental backup point. Circuit 730 may also provide means for restoring the tracking-enabled storage volume from the full backup or the incremental backups.

The means associated with circuit 730 may be implemented, for example, as an ASIC. The means may also be implemented as computer executable instructions that are presented to computer 700 as data 716 that are temporarily stored in memory 704 and then executed by processor 702.

In an example configuration of the computer 700, the processor 702 may be a variety of various processors including dual microprocessor and other multi-processor architectures. A memory 704 may include volatile memory and/or non-volatile memory. Non-volatile memory may include, for example, ROM, PROM, or other memory. Volatile memory may include, for example, RAM, SRAM, DRAM, or other memory.

A disk 706 may be operably connected to the computer 700 via, for example, an input/output interface (e.g., card, device) 718 and an input/output port 710. The disk 706 may be, for example, a magnetic disk drive, a solid state disk drive, a floppy disk drive, a tape drive, a Zip drive, a flash memory card, a memory stick, or other device. Furthermore, the disk 706 may be a CD-ROM drive, a CD-R drive, a CD-RW drive, a DVD ROM drive, a Blu-Ray drive, an HD-DVD drive, or other device. The memory 704 can store a process 714 and/or a data 716, for example. The disk 706 and/or the memory 704 can store an operating system that controls and allocates resources of the computer 700.

The bus 708 may be a single internal bus interconnect architecture and/or other bus or mesh architectures. While a single bus is illustrated, it is to be appreciated that the computer 700 may communicate with various devices, logics, and peripherals using other busses (e.g., PCIE, 1394, USB, Ethernet). The bus 708 can be types including, for example, a memory bus, a memory controller, a peripheral bus, an external bus, a crossbar switch, and/or a local bus.

The computer 700 may interact with input/output devices via the i/o interfaces 718 and the input/output ports 710. Input/output devices may be, for example, a keyboard, a microphone, a pointing and selection device, cameras, video cards, displays, the disk 706, the network devices 720, and other devices. The input/output ports 710 may include, for example, serial ports, parallel ports, and USB ports.

The computer 700 can operate in a network environment and thus may be connected to the network devices 720 via the i/o interfaces 718, and/or the i/o ports 710. Through the network devices 720, the computer 700 may interact with a network. Through the network, the computer 700 may be logically connected to remote computers. Networks with which the computer 700 may interact include, but are not limited to, a LAN, a WAN, and other networks.

One example of a method for providing data protection of container persistent storage volumes includes: creating a tracking-enabled storage using a Changed Block Tracking (CBT) mechanism; associating the tracking-enabled storage with a container; performing a Full backup by reading the tracking-enabled storage volume or device; identifying a point where the Full backup was taken; performing a first Incremental backup by querying the CBT mechanism for changes that have occurred since the Full backup; upon detecting a block that has or a plurality of blocks that have changed: reading the block or blocks that have changed, and writing the block or blocks that have changed to a target backup device; persisting a current tracking point that is associated with the first Incremental backup; performing a next Incremental backup, where performing the next Incremental backup includes using a first Incremental backup's tracking point to identify a changed block list and back up only the changed block or blocks since the time of the previous Incremental backup; and persisting the tracking point of the latest Incremental backup. The method may further include restoring the tracking-enabled storage from the target backup device. Restoring the tracking-enabled storage from the target backup device may include writing the full backup and at least one of the first Incremental backup or a next Incremental backup to a recovery storage device.

In this embodiment, the tracking-enabled storage is a container persistent storage device, and the target backup device is multi-tier data storage device. A multi-tier data storage device may store data of different value or age on different storage media having different performance characteristics. In a tiered data storage system, differently valued data, or data of different categories, may be stored on different storage media based on, for example, the category of the data, the age of the data, a frequency of access of the data, or data protection requirements associated with the data. A multi-tier data storage device may use data storage devices that have different performance characteristics and costs. For example, a tiered storage system may use tape drives, local disk drives, or solid state drives (SSD) to store a file, to store information about a file, to store redundant copies of files, or to store other electronic data.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and other similar terms, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer component", as used herein, refers to a computer-related entity (e.g., hardware, firmware, software in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer-readable storage medium" or "computer-readable storage device" as used herein, refers to a non-transitory medium that stores instructions and/or data. "Computer-readable storage medium" or "computer-readable storage device" does not refer to propagated signals, per se. A computer-readable medium may take forms, including, but not limited to, non-volatile media, and volatile media. Non-volatile media may include, for example, optical disks, magnetic disks, and other disks. Volatile media may include, for example, semiconductor memories, dynamic memory, and other memories. Common forms of a computer-readable medium or computer-readable storage device may include, but are not limited to, a floppy disk, a flexible disk, a hard disk, a magnetic tape, a solid state device (SSD) a shingled magnetic recording (SMR) device, other magnetic medium, an ASIC, a CD, other optical medium, a RAM, a ROM, a memory chip or card, a memory stick, and other media from which a computer, a processor or other electronic device can read.

"Data store", as used herein, refers to a physical and/or logical entity that can store data. A data store may be, for example, a database, a table, a file, a data structure (e.g. a list, a queue, a heap, a tree) a memory, a register, or other repository. In different examples, a data store may reside in one logical and/or physical entity and/or may be distributed between two or more logical and/or physical entities.

"Circuit", as used herein, includes but is not limited to hardware, firmware, software in execution on a machine, and/or combinations of each to perform a function(s) or an action(s), and/or to cause a function or action from another logic, method, and/or system. A circuit may include, for example, a software controlled microprocessor, a discrete logic (e.g., ASIC), an analog circuit, a digital circuit, a programmed logic device, or a memory device containing instructions. A circuit may include one or more gates, combinations of gates, or other circuit components. Where multiple circuits are described, it may be possible to incorporate the multiple circuits into one circuit. Similarly, where a single circuit is described, it may be possible to distribute that single circuit between multiple circuits.

"Software", as used herein, includes but is not limited to, one or more executable instructions that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, or programs including separate applications or code from dynamically linked libraries.

While example methods, apparatus, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A non-transitory computer-readable storage device storing computer executable instructions that when executed control a processor to perform operations, the operations comprising:
   creating a tracking-enabled storage volume, where the tracking-enabled storage volume includes a Changed Block Tracking (CBT) component, where creating the tracking-enabled storage volume comprises overlaying an existing block storage device with a CBT block storage device that encapsulates a CBT functionality of the CBT component;
   associating the tracking-enabled storage volume with a container;
   performing a full backup of the tracking-enabled storage volume;
   generating a full backup point, where the full backup point identifies a point in time when the full backup was taken;
   performing a first incremental backup of the tracking-enabled storage volume, where performing the first incremental backup includes:
      defining a current incremental backup point;
      querying the CBT component for blocks that have changed in the tracking-enabled storage volume since the full backup point;
      upon detecting that blocks have changed in the tracking-enabled storage volume since the full backup point:
         reading the blocks that have changed;
         writing the blocks that have changed to a target backup device; and
         updating the current incremental backup point;
   determining whether a backup termination condition has been met;
   upon determining the backup termination condition has not been met:
      performing a subsequent incremental backup of the tracking-enabled storage volume, where performing the subsequent incremental backup includes:
         querying the CBT component for blocks that have changed in the tracking-enabled storage volume since the current incremental backup point;
         upon detecting that blocks have changed in the tracking-enabled storage volume since the current incremental backup point:
            reading the blocks that have changed;
            writing the blocks that have changed to the target backup device; and
            updating the current incremental backup point.

2. The non-transitory computer-readable storage device of claim 1, where the tracking-enabled storage volume is a container persistent storage volume.

3. The non-transitory computer-readable storage device of claim 2, where the tracking-enabled storage volume is a hard disk drive (HDD), a shingled magnetic recording (SMR) device, a solid-state device (SSD), a tape storage device, or a cloud storage device.

4. The non-transitory computer-readable storage device of claim 1, where performing the full backup of the tracking-enabled storage volume includes:
   reading all the blocks stored on the tracking-enabled storage volume; and
   writing all the blocks stored on the tracking-enabled storage volume to the target backup device.

5. The non-transitory computer-readable storage device of claim 1, where performing the full backup of the tracking-enabled storage volume includes:
   reading all the blocks or fewer than all the blocks stored on the tracking-enabled storage volume; and
   writing fewer than all the blocks stored on the tracking-enabled storage volume to the target backup device.

6. The non-transitory computer-readable storage device of claim 1, the operations further comprising restoring the tracking-enabled storage volume from the target backup device.

7. The non-transitory computer-readable storage device of claim 6, where restoring the tracking-enabled storage volume from the target backup device includes:
   reading the full backup from the target backup device;
   writing the full backup to a recovery storage device;
   reading at least one of the first incremental backup or the subsequent incremental backup from the target backup device; and
   writing the at least one of the first incremental backup or the subsequent incremental backup to the recovery storage device.

8. The non-transitory computer-readable storage device of claim 6, where restoring the tracking-enabled storage volume from the target backup device includes:
   determining which data in the full backup is not present in the first incremental backup or the subsequent incremental backup;
   reading the data in the full backup that is not present in the first incremental backup or the subsequent incremental backup from the target backup device;
   writing the data in the full backup that is not present in the first incremental backup or the subsequent incremental backup to a recovery storage device;
   reading at least one of the first incremental backup or the subsequent incremental backup from the target backup device; and
   writing the at least one of the first incremental backup or the subsequent incremental backup to the recovery storage device.

9. An apparatus that provides data protection of container persistent storage, the apparatus comprising:
   a processor;
   a memory;
   a set of circuits; and
   an interface that connects the processor, the memory, and the set of circuits, the set of circuits comprising:
      a changed block tracking (CBT) circuit configured to:
         access a container;
         create a tracking-enabled storage volume, where creating the tracking-enabled storage volume comprises overlaying an existing block storage device with a CBT block storage device that encapsulates a CBT functionality of the CBT circuit; and
         associate the tracking-enabled storage volume with the container;

a full backup circuit configured to:
perform a full backup by reading data from the tracking-enabled storage volume and writing the data to a target storage device; and
define a full backup point, where the full backup point identifies a point when the full backup was taken;
an incremental backup circuit configured to:
determine whether a backup termination condition has been met;
upon determining that the backup termination condition has not been met:
perform a first incremental backup based on the full backup point; and
perform a subsequent incremental backup based on the first incremental backup; and
a restore circuit configured to restore the tracking-enabled storage volume from the full backup and at least one of the first incremental backup and the subsequent incremental backup.

10. The apparatus of claim 9, where the tracking-enabled storage volume is a container persistent storage volume, where the container persistent storage volume includes a hard disk drive (HDD), a shingled magnetic recording (SMR) device, a solid-state device (SSD), a tape storage device, or a cloud storage device.

11. The apparatus of claim 9, where the full backup circuit is configured to perform the full backup by:
reading all the blocks stored on the tracking-enabled storage volume; and
writing all the blocks stored on the tracking-enabled storage volume to the target storage device.

12. The apparatus of claim 9, where the full backup circuit is configured to perform the full backup by:
reading all the blocks or fewer than all the blocks stored on the tracking-enabled storage volume; and
writing fewer than all the blocks stored on the tracking-enabled storage volume to the target storage device.

13. The apparatus of claim 9, where the incremental backup circuit is configured to perform the first incremental backup based on the full backup point by:
defining a current incremental backup point;
querying the CBT circuit for blocks stored in the tracking-enabled storage volume that have changed since the full backup point;
upon detecting that blocks have changed in the tracking-enabled storage volume since the full backup point:
reading the blocks that have changed;
writing the blocks that have changed to a target backup device; and
updating the current incremental backup point;
and where the incremental backup circuit is configured to perform the subsequent incremental backup based on the first incremental backup by:
upon determining the backup termination condition has not been met:
performing a subsequent incremental backup of the tracking-enabled storage volume, where performing the subsequent incremental backup includes:
querying the CBT circuit for blocks that have changed in the tracking-enabled storage volume since the current incremental backup point;
upon detecting that blocks have changed in the tracking-enabled storage volume since the current incremental backup point:
reading the blocks that have changed;
writing the blocks that have changed to the target backup device; and
updating the current incremental backup point.

14. The apparatus of claim 9, where the restore circuit is configured to:
read the full backup from the target storage device;
write the full backup to a recovery storage device;
read at least one of the first incremental backup or the subsequent incremental backup from the target storage device; and
write the at least one of the first incremental backup or the subsequent incremental backup to the recovery storage device.

15. The apparatus of claim 9, where the restore circuit is configured to
determine which data in the full backup is not present in the first incremental backup or the subsequent incremental backup;
read the data in the full backup that is not present in the first incremental backup or the subsequent incremental backup from the target storage device;
write the data in the full backup that is not present in the first incremental backup or the subsequent incremental backup to a recovery storage device;
read at least one of the first incremental backup or the subsequent incremental backup from the target storage device; and
write the at least one of the first incremental backup or the subsequent incremental backup to the recovery storage device.

16. A non-transitory computer-readable storage device storing computer executable instructions that when executed by a computer control the computer to perform a method, the method comprising:
creating a tracking enabled storage volume that includes a Changed Block Tracking (CBT) component, where creating the tracking enabled storage volume comprises overlaying an existing block storage device with a CBT block storage device that encapsulates a CBT functionality of the CBT component;
associating the tracking enabled storage volume with a container;
accessing the tracking enabled storage volume;
performing a full backup of the storage volume, where performing the full backup includes defining a full backup point;
performing a first incremental backup of the storage volume based on the full backup point, where performing the first incremental backup includes defining a current backup point;
determining whether a backup termination condition has been met;
upon determining that the backup termination condition has not been met:
performing a subsequent incremental backup of the storage volume based on the current backup point; and
updating the current backup point.

17. The non-transitory computer-readable storage device of claim 16, the method further comprising:
restoring the tracking enabled storage volume from the full backup and at least one of the first incremental backup and the subsequent incremental backup.

18. The non-transitory computer-readable storage device of claim 17, where restoring the tracking enabled storage volume from the full backup and at least one of the first incremental backup and the subsequent incremental backup includes:
reading the full backup from a target storage device;
writing the full backup to a recovery storage device;
reading at least one of the first incremental backup or the subsequent incremental backup from the target storage device; and writing the at least one of the first incremental backup or the subsequent incremental backup to the recovery storage device.

19. The non-transitory computer-readable storage device of claim 17, where restoring the storage volume from the full backup and at least one of the first incremental backup and the subsequent incremental backup includes:
   determining which data in the full backup is not present in the first incremental backup or the subsequent incremental backup;
   reading the data in the full backup that is not present in the first incremental backup or the subsequent incremental backup from a target storage device;
   writing the data in the full backup that is not present in the first incremental backup or the subsequent incremental backup to a recovery storage device;
   reading at least one of the first incremental backup or the subsequent incremental backup from the target storage device; and
   writing the at least one of the first incremental backup or the subsequent incremental backup to the recovery storage device.

* * * * *